(12) United States Patent
Bush

(10) Patent No.: US 7,194,397 B1
(45) Date of Patent: Mar. 20, 2007

(54) ROBUST UNINHABITED AIR VEHICLE ACTIVE MISSIONS

(75) Inventor: Stephen Francis Bush, Latham, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 802 days.

(21) Appl. No.: 09/994,447

(22) Filed: Nov. 27, 2001

(51) Int. Cl.
*G06G 7/48* (2006.01)

(52) U.S. Cl. ............... 703/8; 703/6; 703/7; 703/22; 701/1; 701/2; 701/3; 701/14

(58) Field of Classification Search ............ 703/8, 703/6, 22, 7; 701/3, 23, 1, 2, 14
See application file for complete search history.

(56) References Cited

U.S. PATENT DOCUMENTS

| | | | |
|---|---|---|---|
| 5,575,438 A * | 11/1996 | McGonigle et al. | 244/13 |
| 5,581,250 A * | 12/1996 | Khvilivitzky | 340/961 |
| 5,676,334 A * | 10/1997 | Cotton et al. | 244/17.13 |
| 6,056,237 A * | 5/2000 | Woodland | 244/3.15 |
| 6,122,572 A * | 9/2000 | Yavnai | 701/23 |
| 6,493,609 B2 * | 12/2002 | Johnson | 701/3 |
| 6,873,886 B1 * | 3/2005 | Mullen et al. | 701/2 |
| 6,934,540 B2 * | 8/2005 | Twitchell, Jr. | 455/422.1 |
| 2002/0042706 A1 * | 4/2002 | Rodriguez | 703/22 |
| 2005/0119828 A1 * | 6/2005 | Lahn | 701/223 |

OTHER PUBLICATIONS

"An Architecture for Modeling Uninhabited Aerial Vehicles", Draper et al, IEEE 0-7803-5731-0/99, IEEE 1999.*
"Simulation as s Mission and Rehearsal Tool", W. M. Garrabrants, Proceedings 1998 Winter Simulation Conference, ACM 1998.*
"Technologies for Reliable Autonomous Control (TRAC) of UAV's", Schaefer et al, IEEE 0-7803-6395-7/00, IEEE 2000.*
"Strategic and Tactical Decision-making under Uncertainty", Jorden et al, UC Berkley, Feb. 15, 2001.*

(Continued)

*Primary Examiner*—Fred Ferris
(74) *Attorney, Agent, or Firm*—Scully, Scott, Murphy & Presser, P.C.

(57) ABSTRACT

A command sequence for an autonomous UAV mission is optimized by simulating the performance of a mission in a model environment. Using a genetic algorithm, neural net, or other suitable technique this command sequence is then optimized, to improve the outcome of the mission. A factor in selecting an optimal command sequence will be its compressability. A set of one or more optimal command sequences is compiled. Each optimal command sequence is encoded into an algorithmic active packet of minimum size for uploaded to the UAV, which then executes the mission. To track the UAV in its performance of the mission without compromising its location, the active packets are executed in the simulated environment. The simulated environment is continually updated with the most current available information. The simulation results are an approximation of the current state of the UAV.

7 Claims, 2 Drawing Sheets

OTHER PUBLICATIONS

"Introduction to Information Theory and Data Compression", Hankerson et al, CRC Press, 1997.*

"The TRAC Mission Manager Autonomous Control Executive", Johnson et al, IEEE 0-7803-6599-2/01. IEEE Feb. 2001.*

C-ICAMA, A Centralized Intelligent Channel Assigend Multiple Access fro Multi-layer Ad-Hoc Wireless Networks with UAV's, Gu et al, IEEE 0-7803-6596-8/00, 2000, IEEE.*

AIAA 2000-4189 Simulation Evaluation of a Reconfiguable Flight Controller of a Heli-UAV for Extreme Maneuvers, Yavrucuk et al, AIAA 2000.*

Technologies for Reliable Autonomous Control (TRAC) of UAV's, Park et al, IEEE 0-7803-6395-7/00, IEEE 2000.*

Publication, Genetic Algorithms, by Alexander Schatten, http://www.ifs.tuwien.ac.at/aschatt/info/ga/genetic.html, Nov. 8, 2001.

* cited by examiner

US 7,194,397 B1

ROBUST UNINHABITED AIR VEHICLE ACTIVE MISSIONS

BACKGROUND OF THE INVENTION

1. Field of Invention

The invention relates generally to the field of Uninhabited Air Vehicles (UAVs), and more particularly, it relates to a method of training and monitoring a UAV for a specific mission.

2. Description of Related Art

Autonomous unmanned air vehicles (UAV) have great potential for military and civilian use. Clearly, intelligent unmanned vehicles can readily be sent into hostile situations without fear of casualties. In addition, because the aircraft is intelligent, communication with the vehicle is unnecessary thus increasing its undetected surveillance capability.

Current UAVs have not met the degree of safety and reliability required for autonomous operation over populated areas or in airspace shared with commercial aircraft. Autonomy technologies that can provide reflexive responses and rapid adaptation (as exhibited by a pilot) to compensate for a vehicle's structural, perceptual and control limitations are lacking. This is particularly evident when UAV mishap rates are compared to those of piloted systems.

Compared to piloted aircraft systems, current UAVs are designed to be very low cost, use smaller low-power commercial off-the-shelf components and have very limited redundancy. Unfortunately, the lower requirement for reliability has led to higher failure rates. The higher failure rate is seen as somewhat acceptable because it does not mean the loss of human life, except when the vehicle flies over populated areas. It is desirable, however, for a UAV to be able to safely fly over populated areas, to safely share airspace with other piloted vehicles, and to generally improve the mission success rate. For these reasons, the UAV control systems must be capable of rigorously analyzing and predicting component failures and their effects to determine the appropriate response to faults much as a pilot does prior to or as a result of system failure.

BRIEF SUMMARY OF THE INVENTION

The present invention includes providing a simulation of the environment the UAV is to operate in, and simulating the performance of a mission by the UAV. This simulation takes into account environmental stimuli and mission objectives, and outputs some mission outcome. The command sequence is then optimized using a genetic algorithm, neural net, or other suitable technique, to improve the outcome of the mission. A set of one or more optimal command sequences to achieve the mission is compiled, and each optimal command sequence is encoded into an algorithmic active packet of minimum size. An active packet is the object communicated in an active network. Active networks are a recent development in computer science and networking technology. The application of active networking to the present invention will be elaborated, infra. These active packets are uploaded to the UAV, which then executes the mission.

To track the UAV in its performance of the mission without compromising its location, the active packets are executed in the simulated environment. The simulated environment is continually updated with the most current available information. The simulation results are an approximation of the current state of the UAV.

BRIEF DESCRIPTION OF THE DRAWINGS

These and other features, aspects and advantages of the present invention will be apparent from the following drawings, description and appended claims, where:

DETAILED DESCRIPTION OF THE INVENTION

It is desirable for a UAV operating over hostile territory to be undetectable. Towards that end, limiting or eliminating radio transmissions to and from the UAV decreases the likelihood of detection. Therefore, a UAV capable of operating autonomously without the need to report its status to a remote control system and receive commands from it is less detectable. Further, an autonomous UAV is not vulnerable to having its commands overridden by an outside source.

In order to achieve this goal of autonomy, a UAV must incorporate all decision making into the vehicle while executing a mission. One question that arises is how to best communicate the mission to the UAV. The mission may be represented by static waypoints and commands. However, it can be more efficient to represent the mission in a programmatic or algorithmic manner.

The co-pending application "Optimistic Distributed Simulation for a UAV Flight Control System", Ser. No. 09/994,448, filed 27 Nov. 2000, hereby incorporated by reference, is directed toward active network control of a UAV. Active network control includes state objects that comprise executable code to process the control model. The active missions of the present invention define the executable code for a given UAV mission.

Figure 1A:
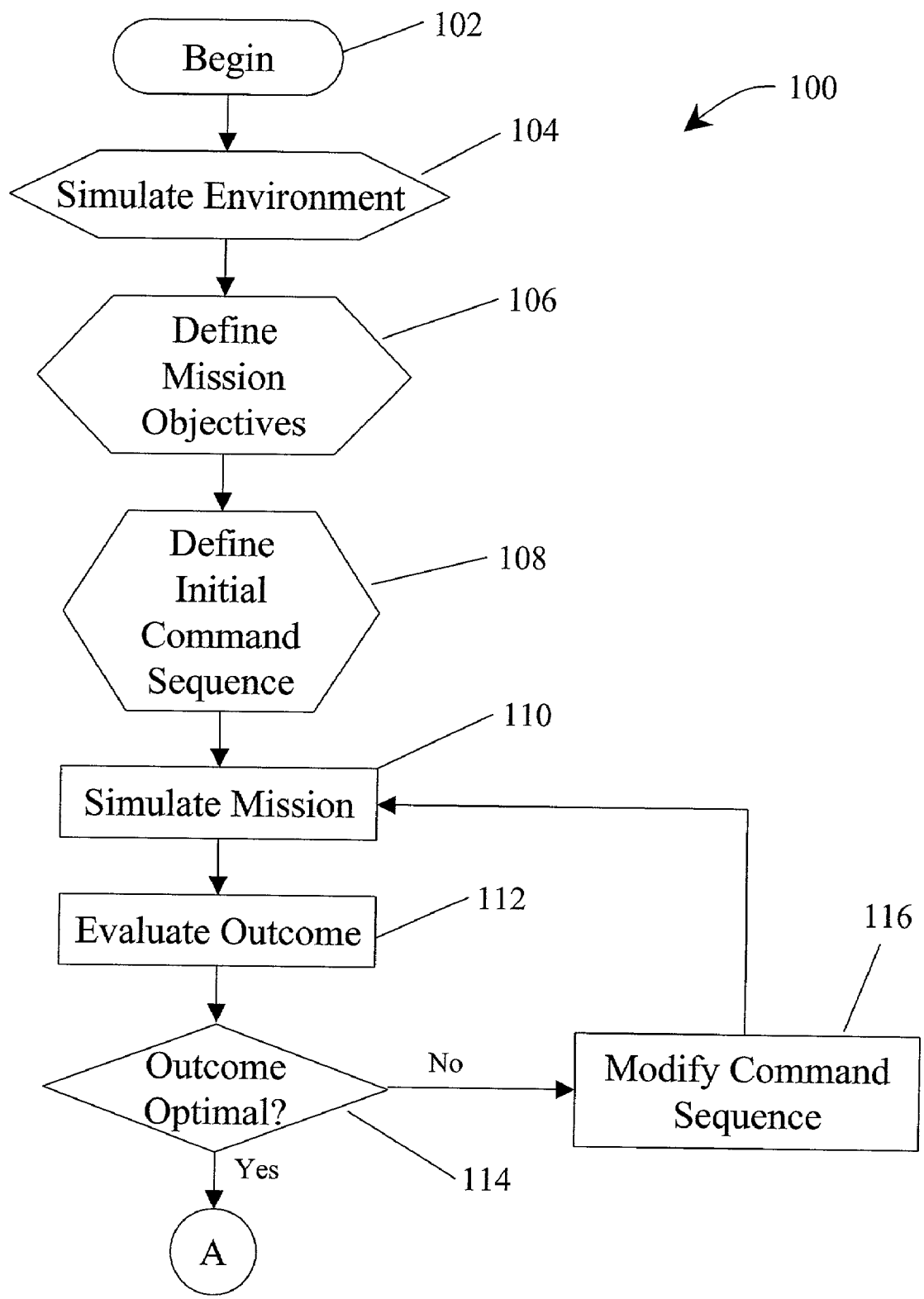
FIGS. 1A and 1B, bridged by connector A, represent a flow chart of an exemplary embodiment of the present invention.

Referring now to FIG. 1A, in an exemplary embodiment, the method of the present invention, generally 100, begins 102 by preparing a simulation 104 of the environment the UAV is to operate in. The simulated environment could include topographical terrain information, known weather conditions and their predicted movements, and/or known enemy locations.

Additionally in preparation, the mission objectives must be defined 106. In one illustration, a reconnaissance mission has the objectives to pass through a given waypoint, take a photograph, and return to base.

A simplistic model of this mission would be a set of intermediate waypoints associated with commands to be executed at those waypoints. The waypoints trace the course of the mission, and the commands specify the actions the UAV will take to achieve the mission at each waypoint. For example, the instruction at an intermediate waypoint may be a null, i.e., an instruction to take no action. The instruction at the target waypoint could be to take a picture.

A randomized, though feasible, command sequence is initially generated 108. A feasible command sequence is one that can achieve the mission goals, and is within the capabilities of the UAV. For example, a next waypoint that cannot be reached by the UAV, either because of a turn radius that is impossible to achieve or because it is beyond the operating range of the UAV, is unfeasible. The initial command sequence is simulated 110, and the outcome is evaluated 112, for example against a fitness function.

When using a genetic algorithm as part of the optimization according to the present method, a fitness function is defined, in a manner known in the art. In this case, the fitness function measures the outcome of the UAV simulation of the command sequence. The fitness function consists of measurable objectives towards achieving the mission goal. An example fitness function for this sample mission might include the following elements:

TABLE

Fitness Function Elements

Measurable damage to the UAV, with emphasis on the flight capability and whether the camera remains in an operational state (minimize damage)
The minimum distance ultimately reached by the UAV from the target to be photographed (minimize target error)
The minimum distance of the UAV from base after the target has been photographed and begins the return flight (minimize return error)
Estimated complexity of the command sequences generated based upon Minimum Data Length (MDL) theory (minimize complexity)

The evaluation of the outcome is compared against some threshold value 114, to determine if more modification 116 is necessary. Care must be taken to avoid converging on a local, rather than global, minimum or maximum value of the fitness function. Through iterative simulation, an optimal command sequence to achieve the mission is developed.

Continuing with example of the genetic algorithm procedure, parent selection, mating and mutation are then performed to optimize the outcome according to the fitness function. Again, this genetic algorithm technique is known in the art, and need not be discussed further. See Schatten, A., Genetic Algorithm Short Tutorial, available online, a copy of which was made of record concurrently with the filing of this application, which is hereby incorporated by reference.

The genetic algorithm will evolve a command sequence optimized to the fitness function. For example, an elevation at a given waypoint may be increased to move above the range of enemy fire. Alternately, the elevation may be reduced to mask the UAV behind terrain features. It is possible that more than one command sequence will result in an optimal mission outcome.

Though the genetic algorithm is illustrated for educing an optimal command sequence, it is not the exclusive means of accomplishing this task. Neural networks techniques, for example, are also well suited to the method of the present invention.

At least one element of the preset invention is including the compressability of the command sequence as a criterion on the same level as an objective of the mission. Its influence will be arbitrary with the relative weighting of the objectives, but this will allow the process to converge, not only on an optimal result, but also on a result that can be optimally communicated to the UAV.

Figure 1B:
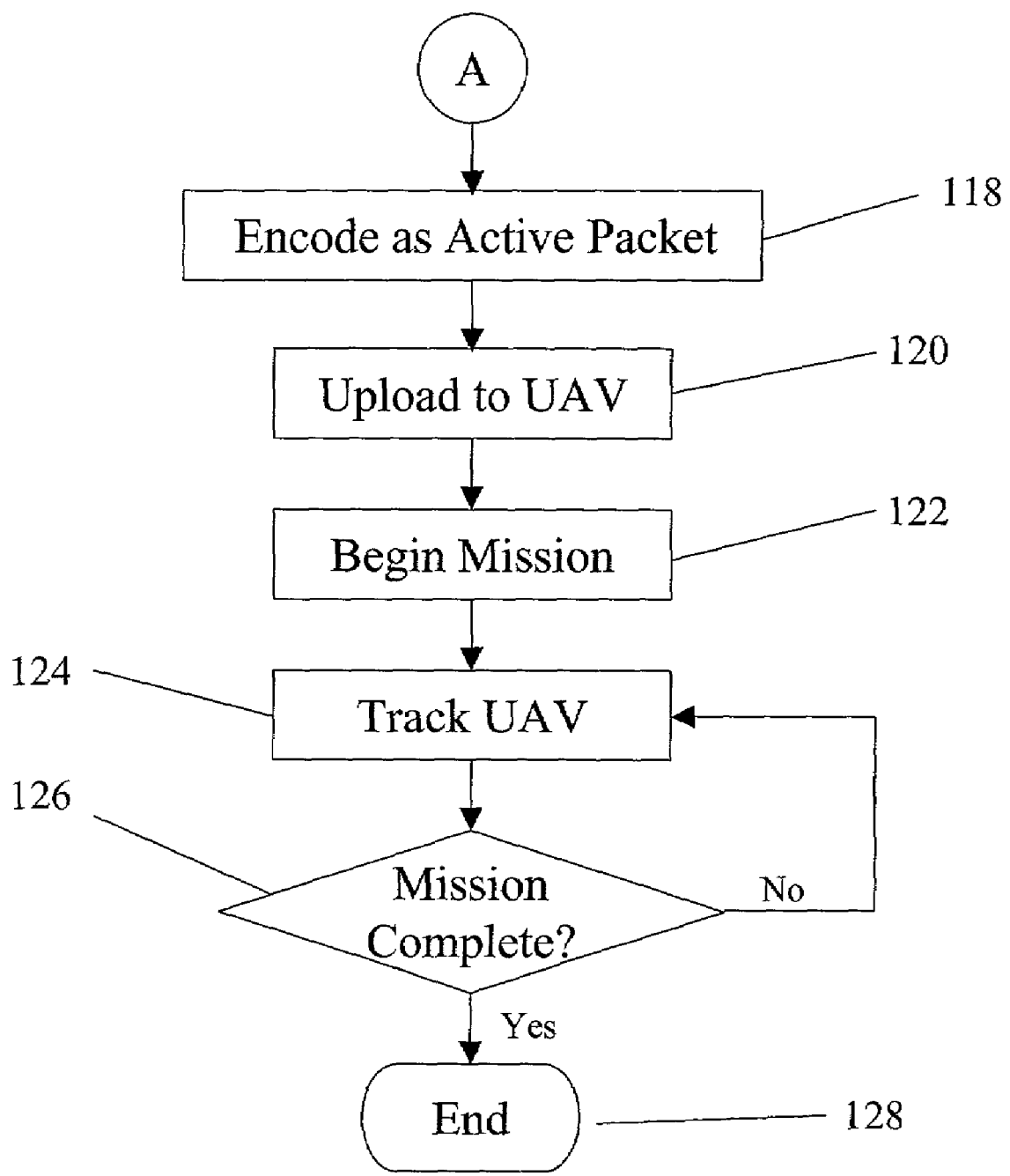

Referring now to FIG. 1B, in the next step of the present method, a set comprising one or more optimal command sequences will be compressed 118 for efficient upload 120 to the UAV. Consider a command sequence as a bound string, x. The Kolmogorov Complexity Estimation, K(x), is the theoretical optimal compression of bound string x. Bound sting x will contain some non-random data that can be expressed algorithmically as code, and some random data that must be expressed as data. The optimal balance of code and data is the subject of the Minimum Data Length (MDL) theorem. See Wallace, C. S., and Dowe, D. L., *Minimum Message Length and Kolmogorov Complexity*, The Computer Journal, Vol. 42, No. 4, 1999.

MDL states that the sum of the length of the hypothesis ($L_H$) about the model generating bound string x and the length of the string ($L_D$) encoded by this hypothesis will estimate the Kolmogorov Complexity of the string, according to the equation:

$$K(x) \approx L_H + L_D$$

Using MDL, efficiency of the command sequence's representation as an active packet can be measured. The hypothesis predicts the value of x, and the data corrects for inaccuracy in the hypothesis due to randomness of the sequence. At a most basic level, the command sequence may be compressed according to any well-known data compression algorithm. However, specific knowledge of the data to be compressed allows a more efficient hypothesis to be developed.

As an illustration, the waypoints defining the course of the sample mission, supra, may be represented by a curve fit. The defining curve is a much more efficient representation of the course than individual waypoints. This information can be represented as code. However, the point at which a picture is to be taken is likely random. It would not be possible to represent this information algorithmically. Therefore, the command to photograph would form the data portion of the active packet, while the course would form the algorithmic portion.

Once the command sequences are compressed 118 into an active packet of minimum size, they can be efficiently uploaded 120 to the UAV. In an effort to make the UAV completely autonomous, this would take place before the UAV is launched. However, another advantage of the present invention is that the active packet may be uploaded by transmission to a UAV already in flight, while minimizing the risk by minimizing the transmission length compared to raw data mission commands.

Tracking the progress of the UAV on the mission has begun 122 by having the UAV transmit status messages could compromise its safety. It is, however, desirable to know when the UAV is or is likely to be during the performance of the mission. Again, referring to the co-pending application "Optimistic Distributed Simulation for a UAV Flight Control System", we assume that control of the UAV while in the performance of the mission includes some ability to adapt to variables than cannot be predicted. Once these conditions become known, however, they can be input into the simulation to determine how the UAV would react in performance of the previously defined mission.

In order to track the UAV 124, the active packets are executed in the simulated environment. If the simulated environment is continually updated with the most current information, then the simulation results will be a good approximation of the state and location of the UAV in performing its mission. The tracking is continuous 126 until the mission is complete 128.

The invention has been described herein with reference to particular exemplary embodiments. Certain alterations and modifications may be apparent to those skilled in the art, without departing from the scope of the invention. The exemplary embodiments are not meant to be limiting on the scope of the invention, which is defined by the appended claims.

The invention claimed is:

1. A method of optimizing a command sequence for a UAV to accomplish mission objectives, comprising the steps of:

(a) simulating the performance of an initial command sequence by a UAV in a simulated environment, resulting in a simulated mission outcome;
(b) modifying the command sequence of said mission;
(c) simulating the performance of said modified command sequence by a UAV in said simulated environment, resulting in another simulated mission outcome;
(d) iteratively performing steps (b) and (c) to optimize the simulated mission outcome;
(e) selecting the one or more command sequences based in part upon which command sequences produce an optimal simulated mission outcome; and
(f) encoding each selected command sequence into an algorithmic active packet.

2. The method of optimizing a command sequence for a UAV according to claim 1, wherein modifying the command sequence comprises using one of a genetic algorithm technique and a neural network technique.

3. The method of optimizing a command sequence for a UAV according to claim 2, wherein modifying the command sequence comprises using a genetic algorithm technique, and further wherein said genetic algorithm comprises a fitness function which measures the simulated outcome against mission objectives.

4. The method of optimizing a command sequence for a UAV according to claim 1, wherein the criteria for an optimal mission outcome include the compressibility of the command sequence.

5. The method of optimizing a command sequence for a UAV according to claim 4, wherein the compressibility of the command sequence is measured according to the Minimum Data Length theorem.

6. The method of optimizing a command sequence for a UAV according to claim 1, wherein step of encoding a command sequence includes representing the commands as an algorithm supplemented by data.

7. The method of optimizing a command sequence for a UAV according to claim 6, wherein the encoded command sequence achieves an optimal compression as measured by the Minimum Data Length theorem.

\* \* \* \* \*